United States Patent
Hawkins et al.

(10) Patent No.: US 9,024,494 B2
(45) Date of Patent: May 5, 2015

(54) MECHANICAL BACKUP BEARING ARRANGEMENT FOR A MAGNETIC BEARING SYSTEM

(71) Applicants: Lawrence A. Hawkins, Redondo Beach, CA (US); Alexei Filatov, Irvine, CA (US)

(72) Inventors: Lawrence A. Hawkins, Redondo Beach, CA (US); Alexei Filatov, Irvine, CA (US)

(73) Assignee: Calnetix Technologies, LLC, Cerritos, CA (US)

(*) Notice: Subject to any disclaimer, the term of this patent is extended or adjusted under 35 U.S.C. 154(b) by 147 days.

(21) Appl. No.: 13/735,468

(22) Filed: Jan. 7, 2013

(65) Prior Publication Data

US 2014/0191604 A1 Jul. 10, 2014

(51) Int. Cl.
*H02K 7/09* (2006.01)
*H02K 5/173* (2006.01)
*H02K 7/08* (2006.01)

(52) U.S. Cl.
CPC ............ *H02K 7/09* (2013.01); *H02K 5/1732* (2013.01); *H02K 7/083* (2013.01); *H02K 2213/06* (2013.01)

(58) Field of Classification Search
USPC .................................................. 310/90.5, 90
See application file for complete search history.

(56) References Cited

U.S. PATENT DOCUMENTS

| | | | |
|---|---|---|---|
| 1,916,256 A | 7/1933 | Chandeysson | |
| 2,276,695 A | 3/1942 | Lavarello | |
| 2,345,835 A | 4/1944 | Serduke | |
| 2,409,857 A | 10/1946 | Hines et al. | |
| 2,917,636 A | 12/1959 | Akeley | |
| 3,060,335 A | 10/1962 | Greenwald | |
| 3,064,942 A | 11/1962 | Martin | |
| 3,243,692 A | 3/1966 | Heissmeier et al. | |
| 3,439,201 A | 4/1969 | Levy et al. | |
| 3,937,533 A | 2/1976 | Veillette | |
| 3,943,443 A | 3/1976 | Kimura et al. | |
| 4,093,917 A | 6/1978 | Haeussermann | |
| 4,127,786 A | 11/1978 | Volkrodt | |
| 4,170,435 A | 10/1979 | Swearingen | |

(Continued)

FOREIGN PATENT DOCUMENTS

DE 102006004836 A1 5/2007
EP 774824 5/1997

(Continued)

OTHER PUBLICATIONS

Office Action issued in U.S. Appl. No. 12/475,052 on Sep. 12, 2012, 8 pages.

(Continued)

*Primary Examiner* — Dang Le
(74) *Attorney, Agent, or Firm* — Fish & Richardson P.C.

(57) ABSTRACT

The present disclosure describes a mechanical backup bearing system arrangement to work in conjunction with non-contact magnetic bearings and capable of coping with thermal expansions of the bearing components during operations. Expansions or contractions of an inner or outer race of a bearing can be compensated using particular springs providing a low profile and a proper stiffness. An electric machine system includes a rotational portion and a stationary portion. The electric machine further includes a magnetic bearing configured to support the rotational portion to rotate within the stationary portion. A mechanical back-up bearing resides in a cavity between the rotational portion and the stationary portion. A flat spring is carried by the stationary portion and abutting the back-up bearing.

15 Claims, 4 Drawing Sheets

(56) References Cited

U.S. PATENT DOCUMENTS

| | | | |
|---|---|---|---|
| 4,260,914 A | 4/1981 | Hertrich | |
| 4,358,697 A | 11/1982 | Liu et al. | |
| 4,362,020 A | 12/1982 | Meacher et al. | |
| 4,415,024 A | 11/1983 | Baker | |
| 4,535,289 A | 8/1985 | Abe et al. | |
| 4,560,928 A | 12/1985 | Hayward | |
| 4,635,712 A | 1/1987 | Baker et al. | |
| 4,639,665 A | 1/1987 | Gary | |
| 4,642,501 A | 2/1987 | Kral et al. | |
| 4,659,969 A | 4/1987 | Stupak | |
| 4,731,579 A | 3/1988 | Petersen et al. | |
| 4,740,711 A | 4/1988 | Sato et al. | |
| 4,806,813 A | 2/1989 | Sumi et al. | |
| 4,920,291 A | 4/1990 | McSparran | |
| 4,948,348 A | 8/1990 | Doll et al. | |
| 5,003,211 A | 3/1991 | Groom | |
| 5,083,040 A | 1/1992 | Whitford et al. | |
| 5,115,192 A | 5/1992 | Bardas et al. | |
| 5,231,323 A * | 7/1993 | New ............................ | 310/90.5 |
| 5,241,425 A | 8/1993 | Sakamoto et al. | |
| 5,315,197 A | 5/1994 | Meeks et al. | |
| 5,481,145 A | 1/1996 | Canders et al. | |
| 5,514,924 A | 5/1996 | McMullen et al. | |
| 5,559,379 A | 9/1996 | Voss | |
| 5,589,262 A | 12/1996 | Kiuchi et al. | |
| 5,627,420 A | 5/1997 | Rinker et al. | |
| 5,672,047 A | 9/1997 | Birkholz | |
| 5,739,606 A | 4/1998 | Takahata et al. | |
| 5,767,597 A | 6/1998 | Gondhalekar | |
| 5,831,431 A | 11/1998 | Gottfried et al. | |
| 5,939,879 A | 8/1999 | Wingate et al. | |
| 5,942,829 A | 8/1999 | Huynh | |
| 5,994,804 A | 11/1999 | Grennan et al. | |
| 6,087,744 A | 7/2000 | Glauning | |
| 6,130,494 A | 10/2000 | Schöb | |
| 6,148,967 A | 11/2000 | Huynh | |
| 6,167,703 B1 | 1/2001 | Rumez et al. | |
| 6,191,511 B1 | 2/2001 | Zysset | |
| 6,259,179 B1 | 7/2001 | Fukuyama et al. | |
| 6,268,673 B1 | 7/2001 | Shah et al. | |
| 6,270,309 B1 | 8/2001 | Ghetzler et al. | |
| 6,304,015 B1 | 10/2001 | Filatov et al. | |
| 6,313,555 B1 | 11/2001 | Blumenstock et al. | |
| 6,325,142 B1 | 12/2001 | Bosley et al. | |
| 6,359,357 B1 | 3/2002 | Blumenstock | |
| 6,437,468 B2 | 8/2002 | Stahl et al. | |
| 6,465,924 B1 | 10/2002 | Maejima | |
| 6,664,680 B1 | 12/2003 | Gabrys | |
| 6,700,258 B2 | 3/2004 | McMullen et al. | |
| 6,727,617 B2 | 4/2004 | McMullen et al. | |
| 6,794,780 B2 | 9/2004 | Silber et al. | |
| 6,856,062 B2 | 2/2005 | Heiberger et al. | |
| 6,876,194 B2 | 4/2005 | Lin et al. | |
| 6,885,121 B2 | 4/2005 | Okada et al. | |
| 6,897,587 B1 | 5/2005 | McMullen et al. | |
| 6,925,893 B2 | 8/2005 | Abe et al. | |
| 6,933,644 B2 | 8/2005 | Kanebako | |
| 7,042,118 B2 | 5/2006 | McMullen et al. | |
| 7,135,857 B2 | 11/2006 | Johnson | |
| 7,217,039 B2 * | 5/2007 | Baudelocque et al. ........ | 384/624 |
| 7,557,480 B2 | 7/2009 | Filatov | |
| 7,635,937 B2 | 12/2009 | Brunet et al. | |
| 8,169,118 B2 | 5/2012 | Filatov | |
| 2001/0017500 A1 | 8/2001 | Hirama et al. | |
| 2001/0030471 A1 | 10/2001 | Kanebako | |
| 2002/0006013 A1 | 1/2002 | Sato et al. | |
| 2002/0175578 A1 | 11/2002 | McMullen et al. | |
| 2003/0155829 A1 | 8/2003 | McMullen et al. | |
| 2003/0197440 A1 | 10/2003 | Hasegawa et al. | |
| 2005/0093391 A1 | 5/2005 | McMullen et al. | |
| 2007/0056285 A1 | 3/2007 | Brewington | |
| 2007/0063594 A1 | 3/2007 | Huynh | |
| 2007/0164627 A1 | 7/2007 | Brunet et al. | |
| 2007/0200438 A1 | 8/2007 | Kaminski et al. | |
| 2007/0296294 A1 | 12/2007 | Nobe et al. | |
| 2008/0211355 A1 | 9/2008 | Sakamoto et al. | |
| 2008/0246373 A1 | 10/2008 | Filatov | |
| 2008/0252078 A1 | 10/2008 | Myers | |
| 2009/0004032 A1 | 1/2009 | Kaupert | |
| 2009/0201111 A1 | 8/2009 | Filatov | |
| 2009/0295244 A1 | 12/2009 | Ries | |
| 2010/0007225 A1 | 1/2010 | Platon et al. | |
| 2010/0090556 A1 | 4/2010 | Filatov | |
| 2010/0117627 A1 | 5/2010 | Filatov | |
| 2010/0301840 A1 | 12/2010 | Filatov | |
| 2011/0101905 A1 | 5/2011 | Filatov | |
| 2011/0163622 A1 | 7/2011 | Filatov et al. | |
| 2011/0234033 A1 | 9/2011 | Filatov | |

FOREIGN PATENT DOCUMENTS

| | | |
|---|---|---|
| EP | 1905948 | 4/2008 |
| GB | 2225813 | 6/1990 |
| JP | 63277443 | 11/1988 |
| JP | 2006136062 A | 5/2006 |

OTHER PUBLICATIONS

Notice of Allowance issued in U.S. Appl. No. 12/610,766, on Oct. 19, 2012; 7 pages.

Office Action issued in U.S. Appl. No. 13/116,991 on Oct. 26, 2012; 13 pages.

Office Action issued in U.S. Appl. No. 13/045,379 on Jun. 21, 2013, 19 pages.

Office Action issued in U.S. Appl. No. 12/985,211 on Jul. 5, 2013, 16 pages.

Office Action issued in U.S. Appl. No. 12/985,911 on Jan. 16, 2014, 10 pages.

Final Office Action issued in U.S. Appl. No. 13/045,379 on Nov. 27, 2013, 19 pages.

U.S. Appl. No. 12/569,559, filed Sep. 29, 2009, Filatov.

U.S. Appl. No. 12/985,911, filed Jan. 6, 2011, Filatov.

U.S. Appl. No. 13/045,379, filed Mar. 10, 2011, Filatov.

U.S. Appl. No. 13/116,991, filed May 26, 2011, Filatov.

Hawkins, Lawrence A. et al., "Application of Permanent Magnet Bias Magnetic Bearings to an Energy Storage Flywheel," Fifth Symposium on Magnetic Suspension Technology, Santa Barbara, CA, Dec. 1-3, 1999, pp. 1-15.

Turboden—Organic Rankine Cycle, "Turboden High Efficiency Rankine for Renewable Energy and Heat Recovery," (2 pages), available at http://www.turboden.it/orc.asp, 1999-2003. printed Jul. 27, 2006.

Turboden—Applications, "Turboden High Efficiency Rankine for Renewable Energy and Heat Recovery," (1 page), available at http://www.turboden.it/applications_detail_asp?titolo=Heat+recovery, 1999-2003, printed Jul. 27, 2006.

Honeywell, "Genetron® 245fa Applications Development Guide," (15 pages), 2000.

Hawkins, Lawrence A. et al., "Analysis and Testing of a Magnetic Bearing Energy Storage Flywheel with Gain-Scheduled, Mimo Control," Proceedings of ASME Turboexpo 2000, Munich, Germany, May 8-11, 2000, pp. 1-8.

McMullen, Patrick T. et al., "Combination Radial-Axial Magnetic Bearing," Seventh International Symposium on Magnetic Bearings, ETH Zurich, Aug. 23-25, 2000, pp. 473-478.

Hawkins, Lawrence et al., "Shock and Vibration Testing of an AMB Supported Energy Storage Flywheel," 8th International Symposium on Magnetic Bearings, Mito, Japan, Aug. 26-28, 2002, 6 pages.

McMullen, Patrick T. et al., "Design and Development of a 100 KW Energy Storage Flywheel for UPS and Power Conditioning Applications," 24th International PCIM Conference, Nuremberg, Germany, May 20-22, 2003, 6 pages.

Hawkins, Larry et al., "Development of an AMB Energy Storage Flywheel for Industrial Applications," 7th International Symposium on Magnetic Suspension Technology, Fukoka, Japan, Oct. 2003, 5 pages.

Freepower FP6,. "Freepower FP6 Specification & Dimensions for 6kWe Electricity Generating Equipment," (2 pages), 2000-2004, printed Jul. 26, 2006.

(56) References Cited

OTHER PUBLICATIONS

Hawkins, Larry et al., "Development of an AMB Energy Storage Flywheel for Commercial Application," International Symposium on Magnetic Suspension Technology, Dresden, Germany, Sep. 2005, 5 pages.
Freepower ORC Electricity Company with Industrial Processes, "Industrial Processes," (1 page), available at http://www.freepower.co.uk/site-5.htm, 2000-2006, printed Jul. 26, 2006.
Freepower ORC Electricity Company FP6 Product Description, "FP6," (1 page), available at http://www.freepower.co.uk/fp6.htm, 2000-2006, printed Jul. 26, 2006.
Freepower ORC Electricity Company FP120 Product Description, "FP120," (1 page), available at http://www.freepower.co.uk/fp120.htm, 2000-2006, printed Jul. 26, 2006.
Freepower ORC Electricity Company FP60 Product Description, "FP60," (1 page), available at http://www.freepower.co.uk/fp60.htm, 2000-2006, printed Jul. 26, 2006.
Freepower ORC Electricity Company Products Technical Overview "A System Overview,"(1 page), available at http://www.freepower.co.uk/tech-overview.htm, 2000-2006, printed Jul. 26, 2006.
Freepower ORC Electricity Company with Landfill Flarestacks, Flarestacks (Landfill & Petrochemical), (1 page) available at http://www.freepower.co.uk/site-2.htm, 2000-2006, printed Jul. 26, 2006.
Huynh, Co et al., "Flywheel Energy Storage System for Naval Applications," GT 2006-90270, Proceedings of GT 2006 ASME Turbo Expo 2006: Power for Land, Sea & Air, Barcelona, Spain, May 8-11, 2006, pp. 1-9.
Freepower ORC Electricity Company Home Page, "Welcome to Freepower," (1 page) available at http://www.freepower.co.uk/, Jul. 18, 2006.
PureCycle: Overview, "Super-efficient, reliable, clean energy-saving alternatives—the future is here," (1 page) available at http://www.utcpower.com/fs/com/bin/fs_com_Page/0,5433,03400,00.html, printed Jul. 26, 2006.
Ormat Web Site: "Recovered Energy Generation in the Cement Industry," (2 pages) available at http://www.ormat.com/technology_cement_2.htm, printed Jul. 26, 2006.
McMullen, Patrick et al., "Flywheel Energy Storage System with AMB's and Hybrid Backup Bearings," Tenth International Symposium on Magnetic Bearings, Martigny, Switzerland, Aug. 21-23, 2006, 6 pages.
International Search Report and Written Opinion of the International Searching Authority issued in International Application No. PCT/US2009/031837 on Sep. 7, 2009; 11 pages.
International Preliminary Report on Patentability issued in International Application No. PCT/US2009/031837 on Jul. 27, 2010, 6 pages.
International Search Report and Written Opinion of the International Searching Authority issued in International Application No. PCT/US2009/058816, mailed Jun. 10, 2010, 10 pages.
International Preliminary Report on Patentability issued in International Application No. PCT/US2009/058816 on Apr. 12, 2011, 5 pages.
Meeks, Crawford, "Development of a Compact, Lightweight Magnetic Bearing," 26th Annual AIAA/SAE/ASME/ASEE Joint Propulsion Conference, Jul. 16-18, 1990, 9 pages.
Ehmann et al., "Comparison of Active Magnetic Bearings With and Without Permanent Magnet Bias," Ninth International Symposium on Magnetic Bearings, Lexington, Kentucky, Aug. 3-6, 2004, 6 pages.
Office Action issued in U.S. Appl. No. 12/267,517 on Mar. 28, 2011, 9 pages.
Office Action issued in U.S. Appl. No. 12/569,559 on Apr. 25, 2011, 22 pages.
Notice of Allowance issued in U.S. Appl. No. 12/569,559 on Aug. 9, 2011, 9 pages.
Notice of Allowance issued in U.S. Appl. No. 12/358,172 on Sep. 20, 2011, 10 pages.
Notice of Allowance issued in U.S. Appl. No. 12/569,559 on Jan. 27, 2012, 6 pages.
Request for Continued Examination filed in U.S. Appl. No. 12/569,559 on Nov. 9, 2011, 13 pages.
Notice of Allowance issued in U.S. Appl. No. 12/267,517 on Feb. 21, 2012, 7 pages.
Amendment filed in U.S. Appl. No. 12/267,517 on Jan. 31, 2012, 9 pages.
Office Action issued in U.S. Appl. No. 12/475,052 on Jun. 19, 2012, 9 pages.
Office Action issued in U.S. Appl. No. 12/475,052 on Sep. 12, 2012.
Amendment filed in U.S. Appl. No. 12/475,052 on Dec. 12, 2012, 13 pages.
Sortore, Christopher K. et al., "Design of Permanent Magnet Biased Magnetic Bearings for a Flexible Rotor" Presentation at the 44th MFPG Meeting, Virginia Beach, VA, Apr. 2-5, 1990 (10 pages).
Notice of Allowance issued in U.S. Appl. No. 13/116,991 on Mar. 7, 2013, 7 pages.

* cited by examiner

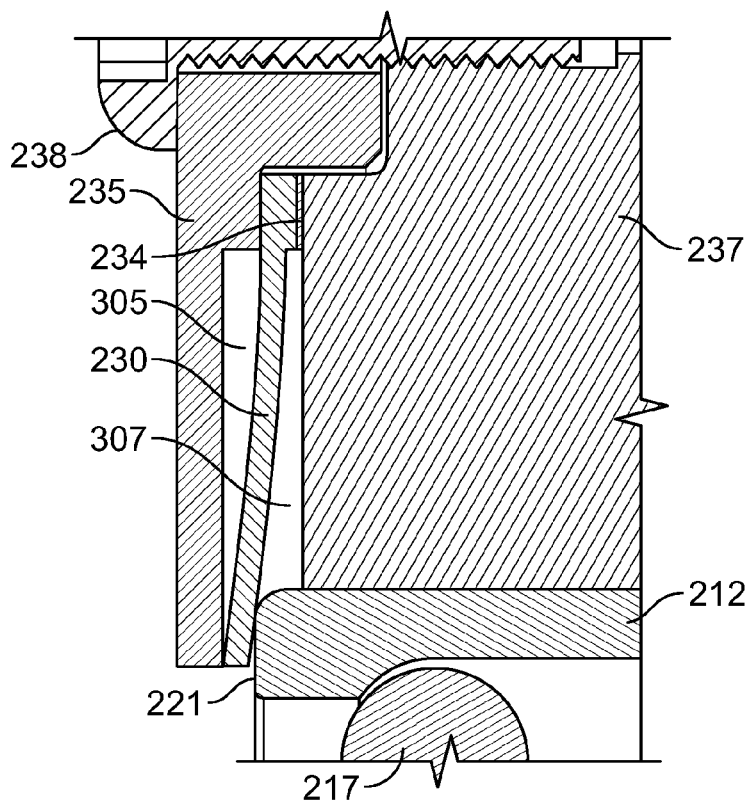
FIG. 3C
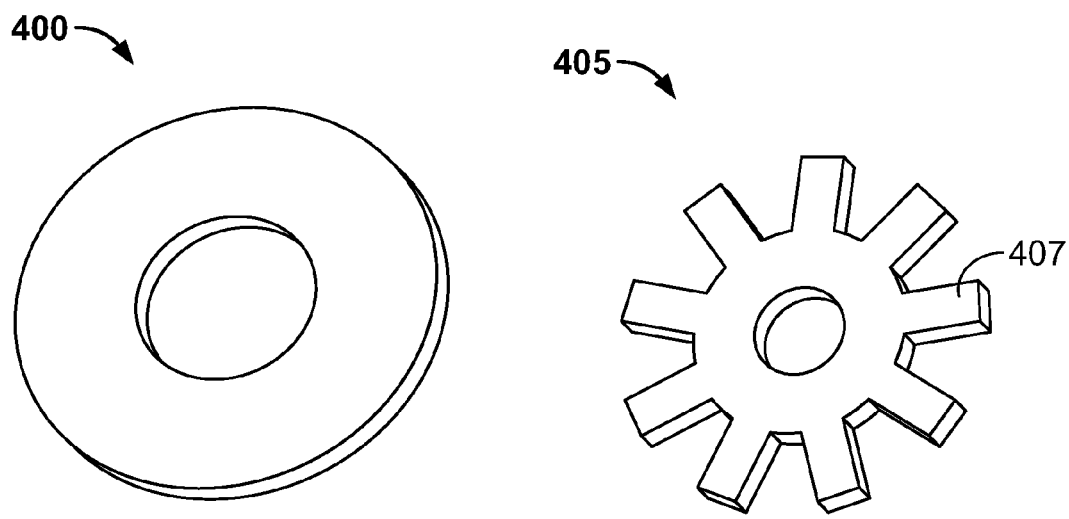
FIG. 4A  FIG. 4B

MECHANICAL BACKUP BEARING ARRANGEMENT FOR A MAGNETIC BEARING SYSTEM

TECHNICAL FIELD

This disclosure relates to bearing systems.

BACKGROUND

Equipment and machinery often contain moving (e.g., rotating, translating) members, which require support during operation. A bearing, or similar device, may be used to support the moving member. Although some bearings may require direct contact with the member to provide the necessary support, some applications benefit from non-contact, or nearly non-contact, support for the member. Application of non-contact bearings may also include direct contact bearings for backup security.

SUMMARY

The present disclosure describes a mechanical backup bearing system arrangement to work in conjunction with non-contact magnetic bearings and capable of coping with thermal expansions of the bearing components during operation. Expansions or contractions of an inner or outer race of a bearing can be compensated using particular springs providing a low profile and a proper stiffness. In a general aspect, an electric machine system includes a rotational portion and a stationary portion. The electric machine further includes a magnetic bearing configured to support the rotational portion to rotate within the stationary portion. A mechanical back-up bearing resides in a cavity between the rotational portion and the stationary portion. A flat spring is carried by the stationary portion and abuts the back-up bearing.

One or more of the following features can be included with the general aspect. The back-up bearing can further include an inner backup bearing race that comes in contact with the rotational portion when the rotational portion is not supported by the magnetic bearing. An outer backup bearing race is also carried by the stationary portion. The outer race and the inner race can encase backup bearing balls. The flat spring can contact the lateral side of the outer race. The flat spring may be configured to deflect upon an axial movement of the lateral side of the outer race. The flat spring can apply a preloaded force to the outer race.

Additional features can be included with the general aspect. The electric machine system can further include a retainer that clamps the flat spring against the stationary portion. The retainer is separated from at least a portion of the flat spring by an air gap. The flat spring can be configured to deflect towards the air gap upon thermal expansion of the inner race of the back-up bearing. The retainer may be a hard stop for deflection of the flat spring upon thermal expansion of the inner race. The stationary portion of the electric machine system can further include an end housing. The flat spring can be carried by the end housing and supported against the end housing by a shim. In some implementations, the flat spring includes a flat circular disk with a central hole. The flat spring may also include a number of radial slots. In some implementations, the back-up bearing can be a duplex bearing.

DESCRIPTION OF DRAWINGS

FIG. 3C is a detailed half-cross-sectional view of the flat spring of FIG. 3A in a full-stop condition.

FIG. 4A is a perspective view of an example spring in accordance with the present disclosure.

FIG. 4B is a perspective view of another example spring in accordance with the present disclosure.

Like reference symbols in the various drawings indicate like elements.

DETAILED DESCRIPTION

Figure 1:
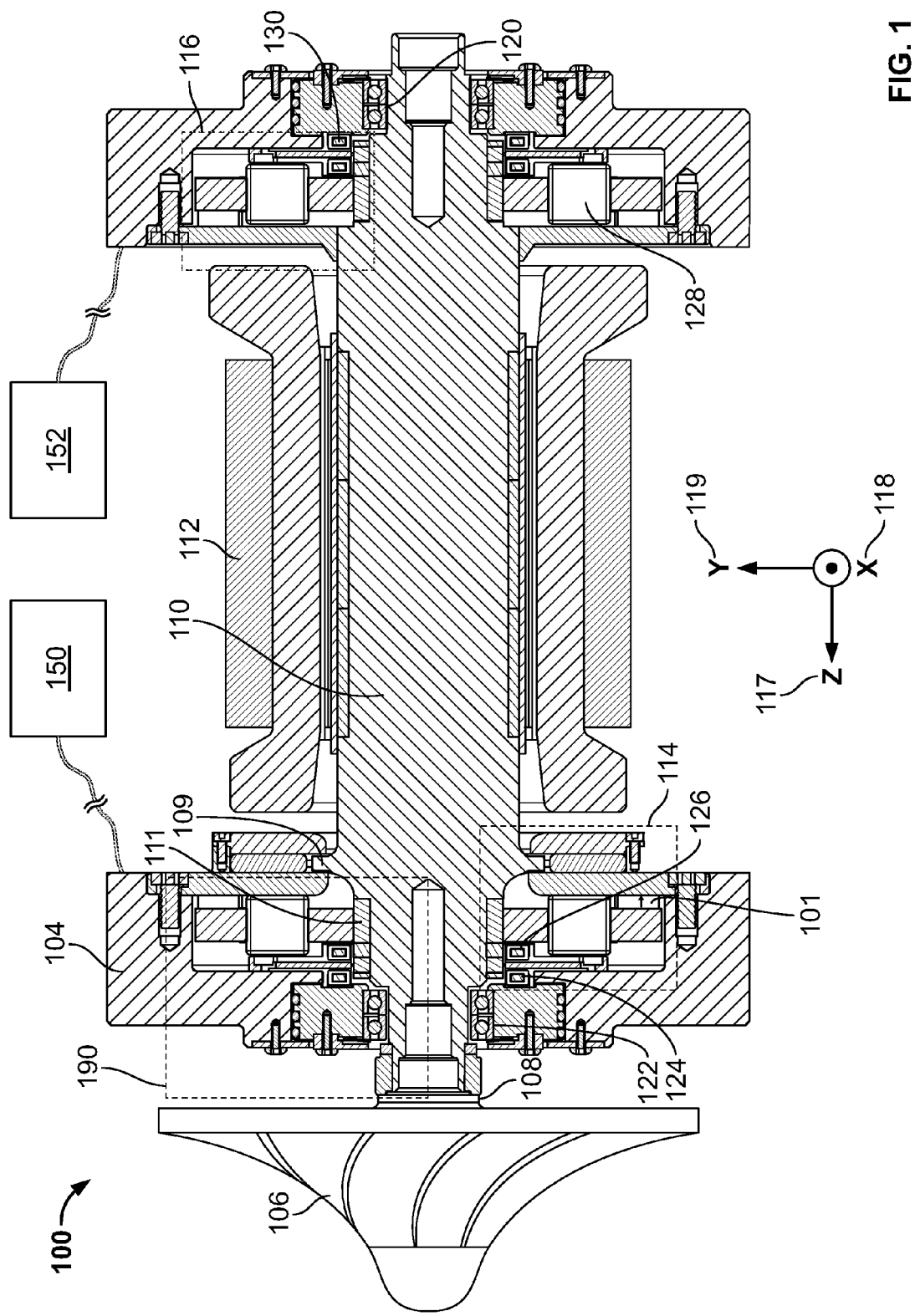
FIG. 1 is a half cross-sectional view of an electric machine system using magnetic bearings in accordance with the present disclosure.

This disclosure relates to a mechanical backup bearing arrangement to work in conjunction with a magnetic bearing system, which features a mechanism for accommodating thermal expansions or contractions of the mechanical bearing components, particularly occurring when the inner races of a backup bearing suddenly come into contact with a moving member. Thermal expansions or contractions of an inner or outer race of a bearing can be compensated by using a flat spring configuration. In an electric machine system, a magnetic bearing system can be backed up by mechanical bearings. The mechanical backup bearings are used in case the magnetic bearings are not used or cannot provide sufficient support, such as due to overloading, component malfunction, or other reasons. The mechanical backup bearing can include two angular contact ball bearings mounted face to face (e.g., two bearings in juxtaposition and opposite in the axial loading direction of each bearing). The ball bearings can include an inner race mounted concentrically with the rotor of the electric machine with a clearance sufficient that there will be no mechanical contact between the rotor and the backup bearing when the rotor is supported by a magnetic bearing. The inner races and the outer races of two ball bearings can be aligned facing each other and each bearing can be dimensioned so that there will be a small gap between the outer races when a clamping pressure is applied to their outer faces bringing the inner races together. In this configuration, clearances between the bearing balls and the inner and outer races can be effectively removed, making the assembly axially and radially very stiff. The clamping force needed to just bring the outer races into contact is referred to as the preload. If the preload is not excessively high, the balls will still maintain an ability to roll around the races. The clamping pressure in this configuration, however, can increase uncontrollably due to thermal expansion of the bearing inner races if the outer races are rigidly clamped against each other. For example, in an electric machine system (e.g., a motor or a generator) having a rotating rotor, the shaft of the rotor can have a much higher temperature than the housing, e.g., as a result of cooling condition differences and the heat generated by rotation and friction at or near the shaft, particularly when a rotating shaft comes into a mechanical contact with the inner races of a backup bearing. Heat of the shaft can be transferred to the bearing inner races, which thermal expansion can result in an increased outward pressure on the bearing balls, which, in turn, will apply more pressure on the bearing outer races. The present disclosure describes a system, method, and apparatus for maintaining adequate/appropriate/correct clamping pressure in a preloaded duplex backup bearing arrangement when the inner race temperature changes.

As described previously, an electric machine system can use magnetic bearings to support a rotor. An Active Magnetic Bearing (AMB) uses an electromagnetic actuator to apply a controlled electromagnetic force to support the moving member in a non-contact, or nearly non-contact, manner. The non-contact or nearly non-contact support provided by the magnetic bearing can allow for frictionless or nearly frictionless rotation of the rotor.

FIG. 1 is a cross-sectional view of an electric rotational machine 100 in accordance with the present disclosure. FIG. 1 shows an example of using an AMB system in an electric rotational machine 100. The electric rotational machine 100 can be, for example, an electric motor 104 driving an impeller 106 (e.g., liquid and/or gas impeller) mounted directly on the motor shaft 108. The electric motor 104 shown in FIG. 1 has a rotor 110 and a stator 112. Alternatively, the impeller 106 can be driven by a flow of gas or liquid and spin the rotor 110 attached to it through the motor shaft 108. In this case, the electric motor 104 can be used as a generator which would convert the mechanical energy of the rotor 110 into electricity. In embodiments, the rotor 110 of the electric rotational machine 100 can be supported radially and axially without mechanical contact by means of front and rear radial AMBs 114 and 116. The front combination AMB 114 provides an axial suspension of the rotor 110 and a radial suspension of the front end of the rotor, whereas the rear radial AMB 116 provides only radial suspension of the rear end of the rotor 110.

When the radial AMBs 114 and 116 are deactivated, the rotor rests on the mechanical backup bearings 120 and 122. The front mechanical backup bearing 122 may provide the axial support of the rotor 110 and a radial support of the rotor front end, whereas the rear mechanical backup bearing 120 may provide radial support of the rear end of the rotor 110. There are radial clearances between the inner diameters of the mechanical backup bearings 120, 122 and the outer diameters of the rotor portions interfacing with those bearings to allow the rotor 110 to be positioned radially without touching the mechanical backup bearings 120, 122 when radial AMBs 114 and 116 are activated. Similarly, there are axial clearances between the mechanical backup bearings 120, 122 and the portions of the rotor 110 interfacing with those bearings to allow the rotor 110 to be positioned axially without touching the mechanical backup bearings 120 and 122 when radial AMBs 114 and 116 are activated.

Figure 2:
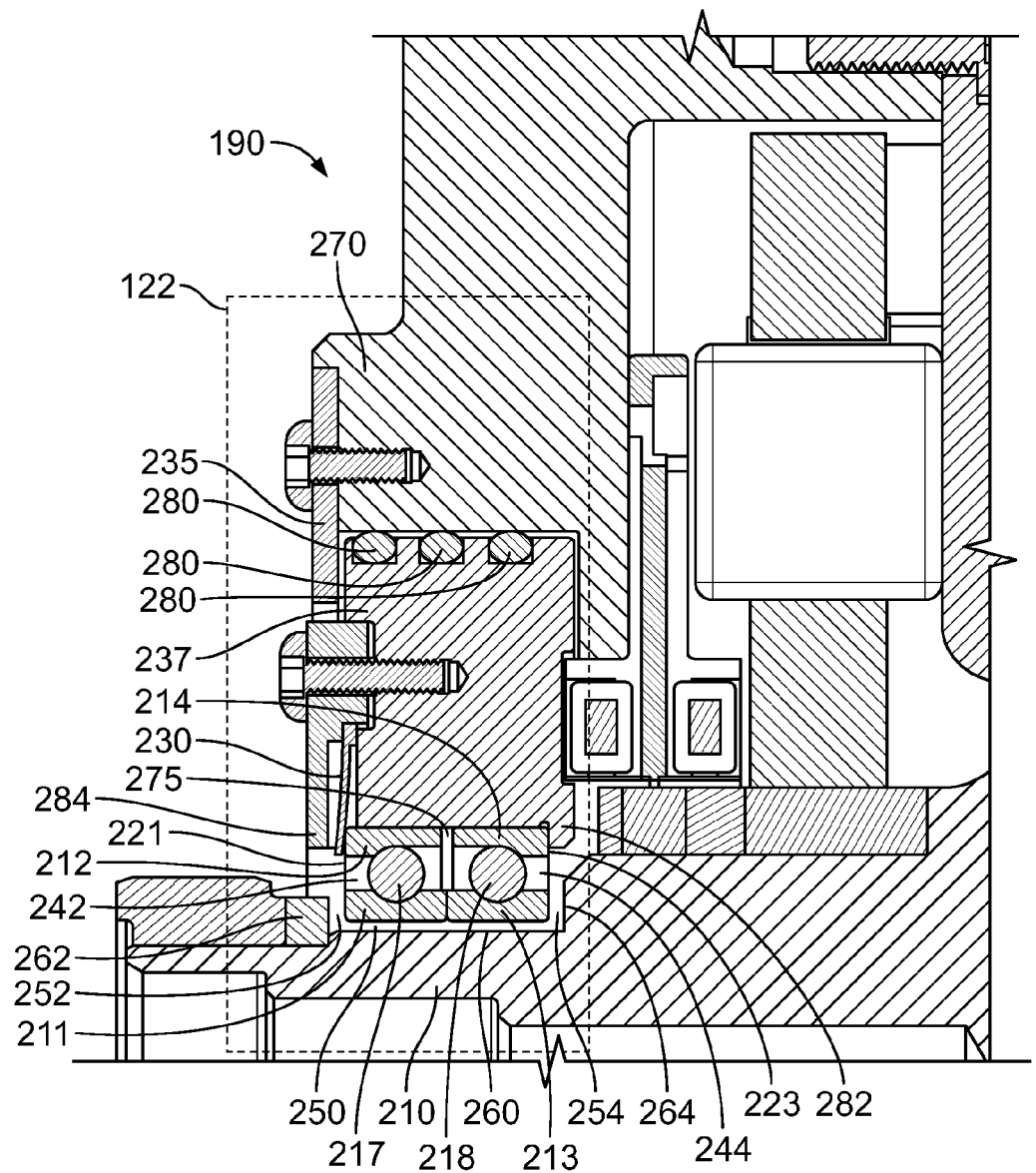
FIG. 2 is a detailed cross-sectional view of a backup bearing system of the electric machine system of FIG. 1.

The front mechanical backup bearing 122 is further discussed in FIG. 2, which depicts details of the view 190. As described above, FIG. 2 is a detailed cross-sectional view 190 of the front mechanical backup bearing 122 of the electric rotational machine system 100 of FIG. 1. Details of the axial spring 230 are further discussed in FIGS. 3A to 3C. Briefly, and in conjunction with FIG. 2, view 190 illustrates a front mechanical backup bearing 122 formed by two angular-contact ball bearings 242 and 244 aligned concentrically to each other and to the rotor 210 while maintaining a radial clearance 250 and axial clearances 252 and 254 between the backup bearing inner races 211 and 213 and the rotor 210 when the rotor 210 is supported by front and rear radial Active Magnetic Bearings 114 and 116 as shown in FIG. 1. When the rotor 210 is not supported by front and rear radial Active Magnetic Bearings 114 and 116, their displacement on this end of the machine is limited in extent since either the cylindrical landing surface 260 or axial landing surfaces 262 or 264 of the rotor 210 will come into contact with the backup bearing inner races 211 and 213.

As it is commonly done in backup bearings for Active Magnetic Bearing systems, the angular-contact ball bearings 242 and 244 are mounted in a resilient mount cartridge 237 which is located inside of a stationary cavity formed by the machine housing 270 and a resilient mount cover 235. The resilient mount cartridge 237 is dimensioned so that by itself it is free to move radially within the cavity, but has minimal ability to move axially. The radial movements of the resilient mount cartridge 237 are constrained by flexible elements 280 (e.g. O-rings), which also may dampen possible radial oscillations of the resilient mount cartridge 237 and angular-contact ball bearings 242 and 244 that it supports. Such arrangement may be needed to improve radial system dynamics when the rotor 210 comes in contact with the backup bearings after being supported by AMBs.

The angular-contact ball bearings 242 and 244 are dimensioned so that when a clamping pressure is applied to the outer faces 221 and 223 of their outer races 212 and 214, their backup bearing inner races 211 and 213 come in contact, whereas a small axial gap 275 is maintained between the inner faces of the outer races 212 and 214. Such a scheme eliminates a free play between the bearing balls 217, 218 and the inner and outer backup bearing races 211 through 214. It is also possible to completely close the gap 275 if a sufficient preload is applied.

As disclosed, the clamping pressure is generated by an axial spring 230, which can be dimensioned to have a right amount of axial stiffness: large enough to maintain the outer race 214 in contact with the right hard stop 282, but not so excessive that thermal growth of the backup bearing inner races 211 and 213 would result in excessive clamping pressure to cause the bearing balls 217 and 218 to cease rotating around the bearing races.

In case an excessive axial loading is exerted by the rotor 210 on angular-contact ball bearings 242 and 244 in the direction to deflect the axial spring 230 outboard (to the left in FIG. 2), a hard mechanical stop 284 can be added to limit the spring deflection and the amount of the axial travel allowable for the rotor 210.

Front AMB 114 consists of a combination radial and axial electromagnetic actuator 101, radial position sensors 124, axial position sensor 126 and control electronics 150. The combination radial and axial electromagnetic actuator 101 may be capable of exerting axial forces on the axial actuator target 109 and radial forces on the radial actuator target 111, both rigidly mounted on the rotor 110. The axial force is the force in the direction of Z-axis 117 and the radial forces are forces in the direction of X-axis 118 (directed out-of-the-page) and the direction of Y-axis 119. The actuator may have at least three sets of coils corresponding to each of the axes and the forces that may be produced when the corresponding coils are energized with control currents produced by control electronics 150. The position of the front end of the rotor is constantly monitored by non-contact position sensors, such as radial position sensors 124 and axial position sensors 126. The non-contact radial position sensors 124 can monitor the radial position of the front end of the rotor 110, whereas the non-contact axial position sensors 126 can monitor the axial position of the rotor 110.

Signals from the non-contact radial position sensors 124 and axial position sensors 126 may be input into the control electronics 150, which may generate currents in the control coils of the combination radial and axial electromagnetic actuator 101 when it finds that the rotor 110 is deflected from the desired position such that these currents may produce forces pushing the rotor 110 back to the desired position.

At the rear radial AMB 116 is an electromagnetic actuator 128, radial non-contact position sensors 130, and control electronics 152. The rear radial AMB 116 may function similarly to the front radial AMB 114 except that it might not be configured to control the axial position of the rotor 110 because this function is already performed by the front radial AMB 114. Correspondingly, the electromagnetic actuator 128 may not be able to produce controllable axial force and there may be no axial position sensor.

As described above, FIG. 2 is a detailed cross-sectional view 190 of the front mechanical backup bearing 122 of the electric rotational machine system 100 of FIG. 1. Details of the axial spring 230 are further discussed in FIGS. 3A to 3C.

Figure 3A:
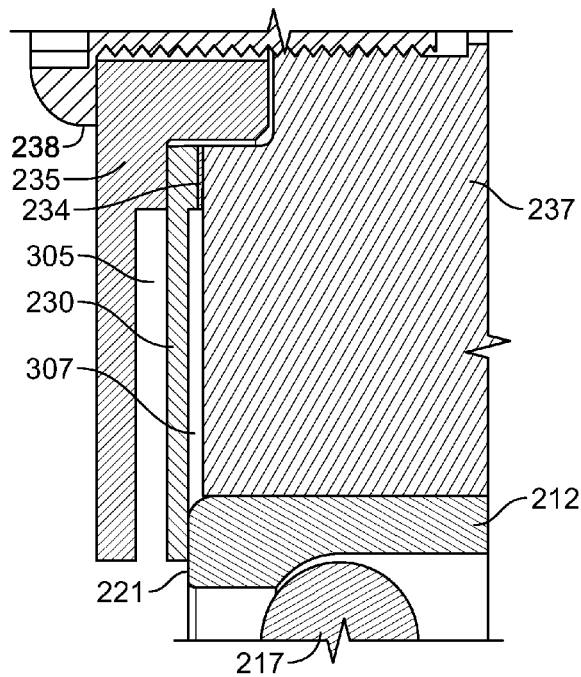
FIG. 3A is a detailed half cross-sectional view of a flat spring in loaded condition as implemented in FIG. 2.

FIG. 3A is a detailed half cross-sectional view of a flat spring in loaded condition as implemented in FIG. 2. There is a gap 305 between the axial spring 230 and the resilient mount cover 235. The gap 305 is created by a thickness difference in the resilient mount cover 235. The insertion of a shim 234 between the axial spring 230 and the resilient mount cartridge 237 can be used to adjust a clearance 307. The clearance 307 allows the axial spring 230 to be in direct contact with the outer race 212 without any interference with the resilient mount cartridge 237. The axial spring 230 supports the outer race 212 by applying a pre-load compression onto the outer faces 221 of the outer race 212. The pre-load compression associates to the clamping force discussed above. When the outer race 212 translates due to thermal expansion of the backup bearing inner races 211, the axial spring 230 deflects outwards into the gap 305 to allow for the thermal expansion while maintaining a similar level of pre-load compression. In some instances when the thermal expansion causes excessive expansion (e.g., machine being overheated), the axial spring 230 can be stopped by the resilient mount cover 235 when the deflection has travelled across the gap 305. The resilient mount cover 235 therefore acts as a hard stop for deflection of the axial spring 230 upon thermal expansion of the backup bearing inner race 211.

In some implementations, the axial spring 230 is an annular plate having a suitable thickness, outer diameter, and inner diameter to provide sufficient stiffness for supporting the pre-load compression to the outer race 212. In some implementations, the axial spring 230 is a wave spring that includes one or more layers of circular, wavy, flat wires. In some implementations, the axial spring 230 is a Belleville washer or spring, having a frusto-conical shape. Other types of axial springs are also contemplated and described in FIGS. 4A-B.

Figure 3B:
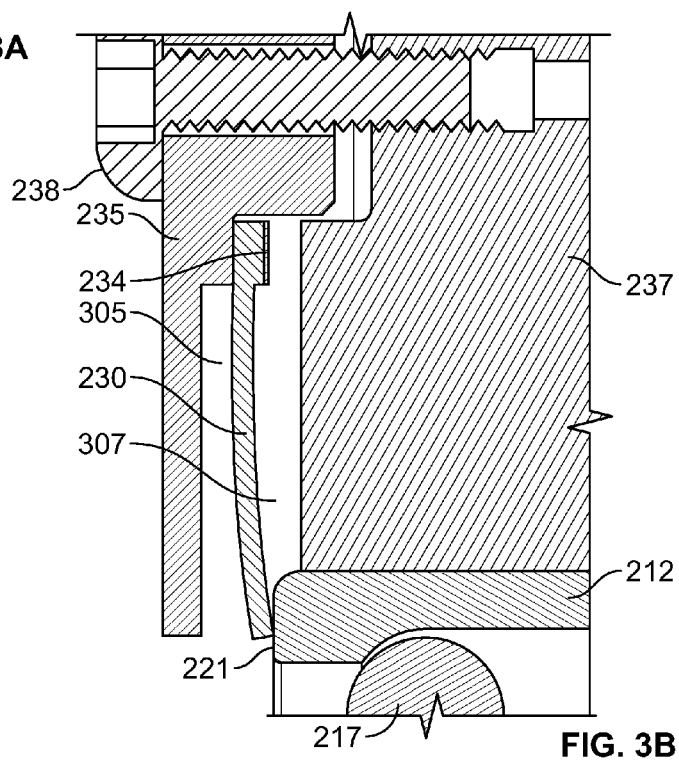
FIG. 3B is a detailed half cross-sectional view of the flat spring of FIG. 3A in pre-assembled condition.

FIG. 3B illustrates the axial spring 230 prior to assembly (i.e., the resilient mount cover 235 has not yet been tightened to the end resilient mount cartridge 237). The original shape of the axial spring 230 may be tilted towards the front mechanical backup bearings 122 as illustrated. As the fastener 238 assembles the resilient mount cover 235 to the resilient mount cartridge 237, the axial spring 230 elastically deforms into the position shown in FIG. 3A. The elastic deformation allows the axial spring 230 to generate the pre-load compression to clamp the front mechanical backup bearings 122 in place. FIG. 3C illustrates the axial spring 230 being deflected as the thermal expansion of the front mechanical backup bearings 122 translates the outer race 212 outwards.

FIG. 4A is a perspective view of an example spring 400 in accordance with the present disclosure. FIG. 4A is a perspective view of an example spring 400 having a circular profile resembling a washer. Spring 400 may have a certain conical curvature for providing pre-load compression. The stiffness of the spring 400 may be varied by using different materials, changing the outer diameter, the inner diameter, and the thickness of the spring 400. FIG. 4B is a perspective view of another example spring 405 in accordance with the present disclosure. Spring 405 has fingers 407 that may be used to cover a larger outer diameter at a lower stiffness to allow for thermal expansion. Other implementations are possible and are within the scope of this disclosure.

The present disclosure describes embodiments of an axial spring for allowing thermal expansion in a bearing system. Other embodiments and advantages are recognizable by those of skill in the art by the forgoing description and the claims.

What is claimed is:

1. An electric machine system comprising:
a rotational portion and a stationary portion;
a magnetic bearing configured to support the rotational portion to rotate within the stationary portion;
a mechanical back-up bearing residing in a cavity between the rotational portion and the stationary portion;
a flat spring carried by the stationary portion and abutting the back-up bearing;
a retainer clamping the flat spring against the stationary portion, wherein the retainer is separated from at least a portion of the flat spring by an airgap, wherein the flat spring is configured to deflect towards the air gap upon thermal expansion of the inner race of the back-up bearing.

2. The electric machine system of claim 1, wherein the back-up bearing further comprises:
an inner backup bearing race that comes in contact with the rotational portion when the rotational portion is not supported by the magnetic bearing; and
an outer backup bearing race carried by the stationary portion, the outer race and the inner race encasing backup bearing balls; and wherein the flat spring contacts the lateral side of the outer race.

3. The electric machine system of claim 2, wherein the flat spring is configured to deflect upon an axial movement of the lateral side of the outer race.

4. The electric machine system of claim 2, wherein the flat spring applies a preloaded force to the outer race.

5. The electric machine system of claim 1, wherein the retainer is a hard stop for deflection of the flat spring upon thermal expansion of the inner race.

6. The electric machine system of claim 1, wherein the stationary portion comprises an end housing, and wherein the flat spring is carried by the end housing and supported against the end housing by a shim.

7. The electric machine system of claim 1, wherein the flat spring comprises a flat circular disk with a central hole.

8. The electric machine system of claim 1, wherein the flat spring comprises a plurality of radial slots.

9. The electric machine system of claim 1, wherein the back-up bearing is a duplex bearing.

10. A method comprising:
supporting a rotational portion of an electric machine without a mechanical contact using magnetic bearings under normal operating conditions;
supporting an outer race of a back-up bearing on a stationary portion of the electric machine;
positioning an inner race of the back-u bearing in a close proximity of the rotational portion of the electric machine so that the rotational portion of the electric machine comes into contact with the inner race;
clamping a flat spring on the outer race of the back-up bearing at a preloaded force, the flat spring being configured to deflect upon axial motion of the outer race;
supporting the flat spring using a retainer against a lateral surface of the outer race, wherein the retainer is separated from at least a portion of the flat spring by an air gap, wherein the flat spring is configured to deflect towards the air gap upon thermal expansion of the inner race.

11. The method of claim 10, wherein the retainer is a hard stop for deflection of the flat spring upon thermal expansion of the inner race.

12. The method of claim 11, wherein a shaft is coupled with a rotor of the electric machine.

13. The method of claim 10, further comprising applying a pre-load compression to the lateral surface of the outer race with the flat spring.

14. The method of claim 10, further comprising creating a space with a shim between the flat spring and an end housing, wherein the flat spring is carried by the end housing and supported against the shim.

15. The method of claim 10, wherein the bearing system is a backup bearing of an electric machine.

* * * * *

UNITED STATES PATENT AND TRADEMARK OFFICE
CERTIFICATE OF CORRECTION

| | | |
|---|---|---|
| PATENT NO. | : 9,024,494 B2 | Page 1 of 1 |
| APPLICATION NO. | : 13/735468 | |
| DATED | : May 5, 2015 | |
| INVENTOR(S) | : Hawkins et al. | |

It is certified that error appears in the above-identified patent and that said Letters Patent is hereby corrected as shown below:

In the Claims

Column 6, Line 58, Claim 10, delete "back-u" and insert -- back --, therefor.

Signed and Sealed this
Twenty-second Day of September, 2015

Michelle K. Lee
*Director of the United States Patent and Trademark Office*